(12) United States Patent
Anderson et al.

(10) Patent No.: US 6,983,475 B2
(45) Date of Patent: Jan. 3, 2006

(54) METHOD AND DATA STORAGE DEVICE THAT UTILIZES BLOCKING MATERIAL

(75) Inventors: Daryl E. Anderson, Corvallis, OR (US); Makarand Gore, Corvallis, OR (US); Timothy F. Myers, Philomath, OR (US); Tony S. Cruz-Uribe, Corvallis, OR (US); Michael A. Pate, Corvallis, OR (US); Sharon Leroux, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 10/106,550

(22) Filed: Mar. 26, 2002

(65) Prior Publication Data

US 2003/0185144 A1    Oct. 2, 2003

(51) Int. Cl.
*G11B 3/70*       (2006.01)
(52) U.S. Cl. .................................... 720/718
(58) Field of Classification Search ............... 720/718; 369/273, 275.1, 283, 284, 285, 286; 428/64.4; 347/224, 225
See application file for complete search history.

(56) References Cited

U.S. PATENT DOCUMENTS

| | | | |
|---|---|---|---|
| 4,504,565 A * | 3/1985 | Baldvins et al. ............ | 430/138 |
| 5,518,325 A | 5/1996 | Kahle | |
| 5,762,377 A | 6/1998 | Chamberlain | |
| 5,946,286 A | 8/1999 | Bahns | |
| 6,109,324 A | 8/2000 | Bugner et al. | |
| 6,267,055 B1 * | 7/2001 | Fromson et al. ............ | 101/467 |
| 6,273,167 B1 | 8/2001 | Miller | |
| 6,279,960 B1 | 8/2001 | Claussnitzer | |
| 6,309,724 B1 | 10/2001 | Kulper et al. | |
| 2003/0108708 A1 * | 6/2003 | Anderson et al. .......... | 428/64.4 |
| 2003/0142199 A1 * | 7/2003 | McFarland et al. ......... | 347/251 |

FOREIGN PATENT DOCUMENTS

JP        2000-173096       *  6/2000

* cited by examiner

*Primary Examiner*—Angel Castro (57) ABSTRACT

A data storage device includes a surface used for labeling. The surface is covered, at least in part, with a laser imageable coating. Blocking material is placed over a portion of the laser imageable coating. The blocking material blocks laser imaging on the portion of the laser imageable coating over which the blocking material is placed.

40 Claims, 12 Drawing Sheets

METHOD AND DATA STORAGE DEVICE THAT UTILIZES BLOCKING MATERIAL

RELATED APPLICATIONS

The subject matter of the present patent application is related to the subject matter set out in commonly assigned U.S. patent application Ser. No. 09/976,877 filed Oct. 11, 2001, entitled INTEGRATED CD/DVD RECORDING AND LABELING which is herein incorporated by reference.

BACKGROUND OF THE INVENTION

Data storage devices such as optical storage disks and other optical storage media are increasingly being used to store digitized video, digitized music, digitized photographs, computer programs and other types of data. There are a large variety of types of data storage devices currently being used and others being developed. For example, among the currently most popular types of optical storage devices are compact disks (CD) and Digital Versatile Disks (DVD). CDs and DVDs can be in various formats such as read only memory (ROM), recordable (R), and read/write (RW).

Labeling of Compact Disks (CD) and Digital Versatile disks (DVD) has in the past been routinely accomplished through screen printing methods. In screen printing a stencil of the image is prepared, placed in contact with the CD/DVD. Ink is then spread by squeegee across the stencil surface. Where there are openings in the stencil the ink passes through to the surface of the CD/DVD and the image is produced. Preparation of the stencil is an elaborate, time consuming and expensive process.

Screen printing can provide a wide variety of label content and can be cost effective when identically labeling large numbers of disks. However, when labeling fewer numbers of disk (e.g., less that 400), the set-up costs can result in a high labeling cost per disk.

CDs and DVDs are increasingly being used for all kinds of ad hoc data distribution; therefore, the ability to, with maximum flexibility, provide inexpensive labeling of CDs and DVDs is highly desirable.

SUMMARY OF THE INVENTION

In accordance with an embodiment of the present invention, a data storage device includes a surface used for labeling. The surface is covered, at least in part, with a laser imageable coating. Blocking material is placed over a portion of the laser imageable coating. The blocking material blocks laser imaging on the portion of the laser imageable coating over which the blocking material is placed.

DETAILED DESCRIPTION OF THE PREFERRED EMBODIMENT

Figure 1:
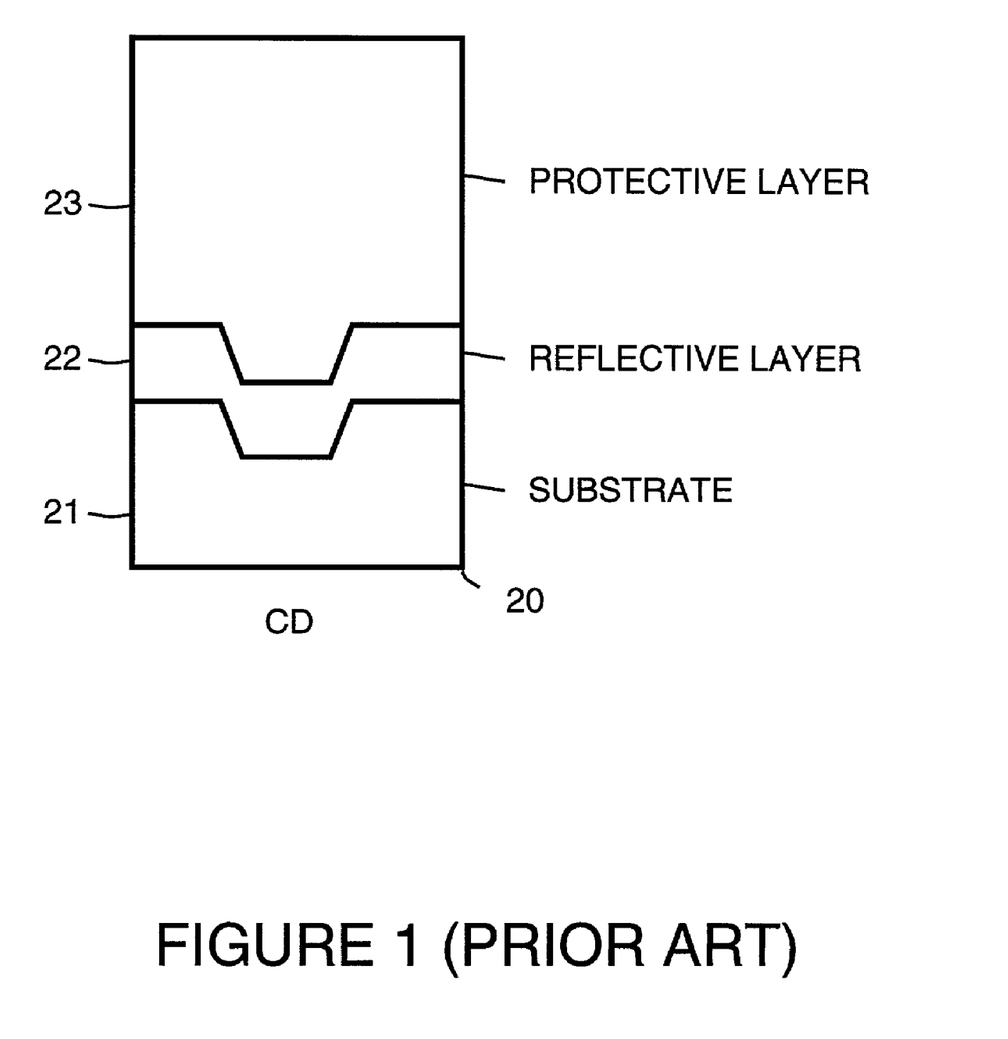
FIG. 1 is a simplified cross-section illustration of the layers of material that generally make up a CD-ROM.

Different technologies are available to store information on optical disks. For example, for CD ROM or DVD ROM technology, data is permanently stored using injection molding. A user can read a ROM, but not write to a ROM. FIG. 1 shows a simplified cross-section illustration 20 of the layers of material that generally make up a CD-ROM. A substrate 21 is, for example, an injection-molded polycarbonate plastic substrate containing a spiral track of variable spaced depressions, called pits, separated by undepressed surface called land. A metalized reflective layer 22 typically consists of aluminum. A protective layer 23 is, for example, composed of lacquer.

Information is retrieved from a CD-ROM or DVD-ROM by focusing a low-power laser beam onto the spiral track of pits and lands in the disk's substrate. The height difference between the pits and the adjacent lands creates a phase shift causing destructive interference in the reflected beam. The effect of these differences in the reflected beam modulates the intensity of the light returned to a photodiode detector. This modulated high-frequency signal is then manipulated, used for tracking, focus and speed control and then decoded and translated into usable data.

When CD-R or DVD-R technology is used to store information, a user can write data once onto the optical disk, for example, using a laser beam.

Figure 2:
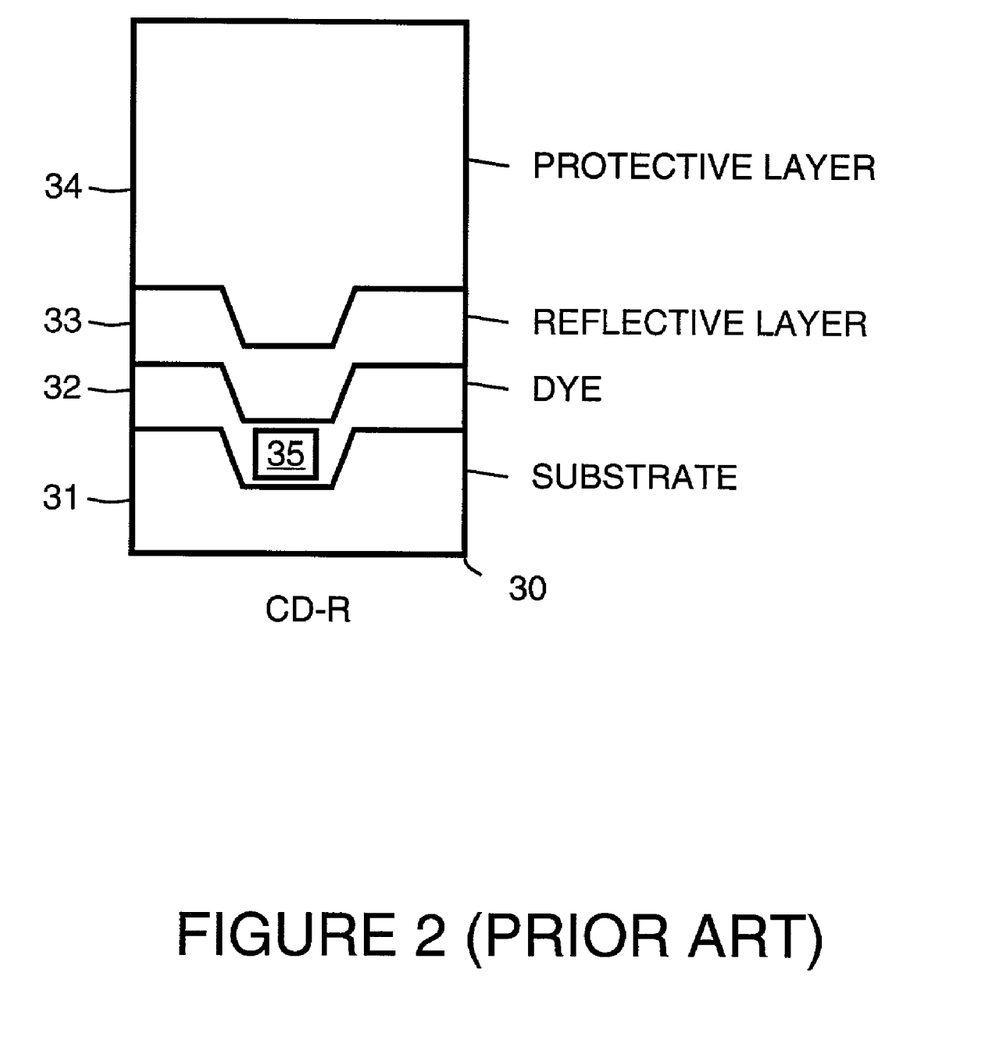
FIG. 2 is a simplified cross-section illustration of the layers of material that generally make up a CD-R.

FIG. 2 shows a simplified cross-section illustration 30 of the layers of material that typically are used for a CD-R or DVD-R optical disk. A substrate 31 is for example, an injection-molded polycarbonate plastic substrate containing a slightly wobbled spiral pregroove. In a dye layer 32, a dye such as cyanine, phthalocyanine, or metallized azo is coated in a polymer binder. A phase change alloy 35 is, for example, a quaternary phase-change alloy composed of silver, indium, antimony, and tellurium. A metallized reflective layer 33 consists of, for example, gold. A protective layer 34 is, for example, composed of lacquer.

Data is written to a CD-R or DVD-R when the heat from the laser causes the dye layer to chemically change formatting readable marks in the dye polymer. The degraded dye polymers in the marked regions are less reflective than the unmarked regions. During the reading process, a low-power laser scans the dye polymer layer in a recorded CD-R CD/DVD. The laser light is reflected directly from the unmarked regions, but is scattered or diminished in the marked regions. The written marks in the dye mimic the destructive interference of molded CD-ROM pits, modulating the intensity of the light beam returned to the photodiode detector and providing reflectivities close enough to a conventional CD-ROM to be read by a device designed to read a CD-ROM.

When CD-RW or DVD-RW technology is used to store information on an optical disk, data can be rewritten many times over. To accomplish this, a six-layer design is typically used, as illustrated by FIG. 3.

Figure 3:
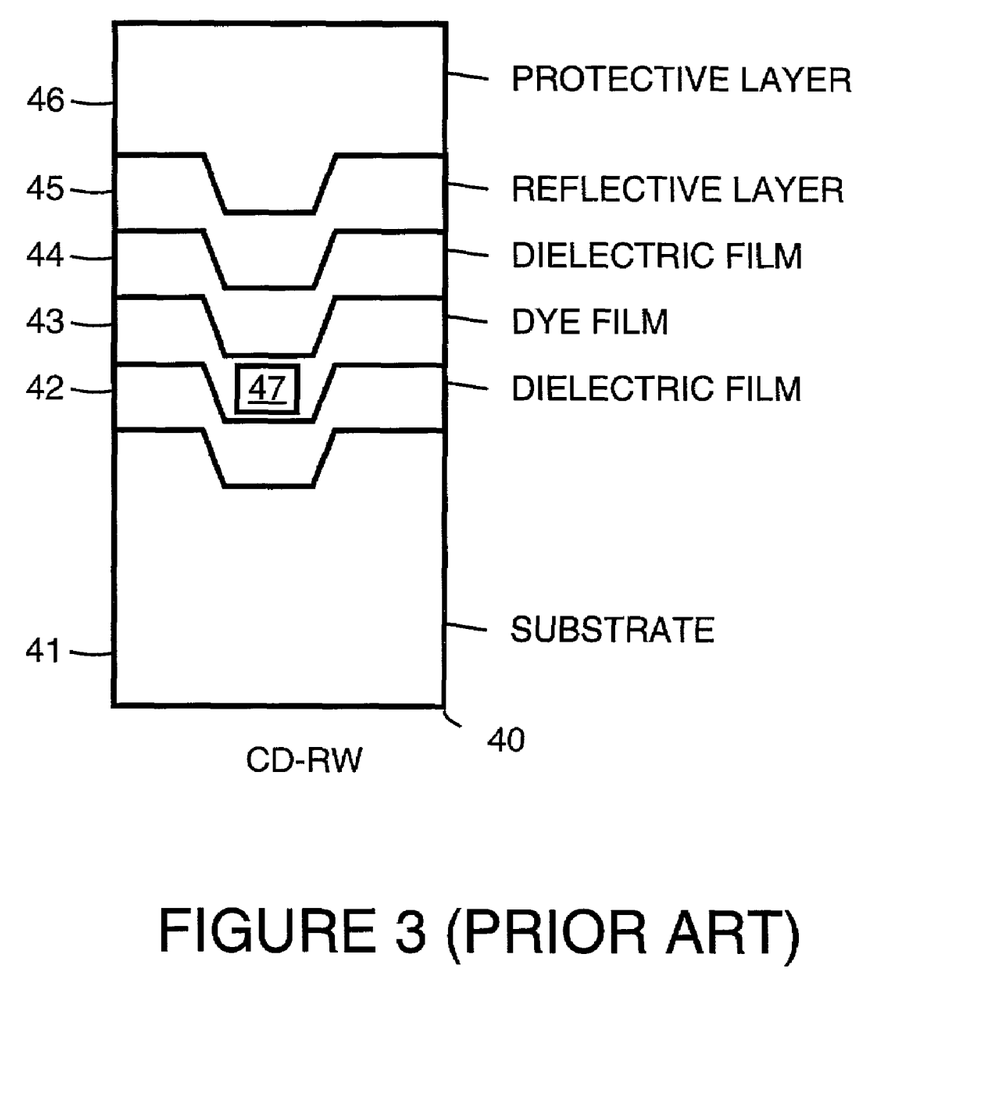
FIG. 3 is a simplified cross-section illustration of the layers of material that generally make up a CD RW.

FIG. 3 shows a simplified cross-section illustration of the layers of material that make one embodiment of a CD-RW or a DVD-RW. A substrate 41 is for example, an injection-molded polycarbonate plastic substrate containing a slightly wobbled spiral pregroove. A lower dielectric layer 42 is, for example, composed of a thermal insulator. In a dye layer 43, a dye such as cyanine, phthalocyanine, or metallized azo is coated in a polymer binder.

A phase change alloy 47 is, for example, a quaternary phase-change alloy composed of silver, indium, antimony, and tellurium. An upper dielectric layer 44 is, for example, composed of a thermal insulator. A metallized reflective layer 45 consists of, for example, aluminum. A protective layer 46 is, for example, composed of lacquer. A CD-RW system operates on the principle of changing the phase of the recording material between a higher reflective crystalline state and a lower reflective amorphous state.

Since laser technology is used to read and write information from optical disks, using laser technology also to print labels can be very efficient and cost efficient. The labels can be written with the same laser that writes data onto an optical disk. Alternatively, the labels can be written with different lasers than the laser that writes data onto an optical disk.

Optical data storage devices are used herein to describe the labeling features of the present invention. Because lasers are involved in optical data storage devices, optical data storage device are preferred embodiments for using laser imageable techniques to provide labeling. However, the principles of the present invention are equally applicable for using laser imageable techniques to provide labeling for other types of data storage devices such as floppy disks, hard disks, cassette tapes, and so on.

Figure 4:
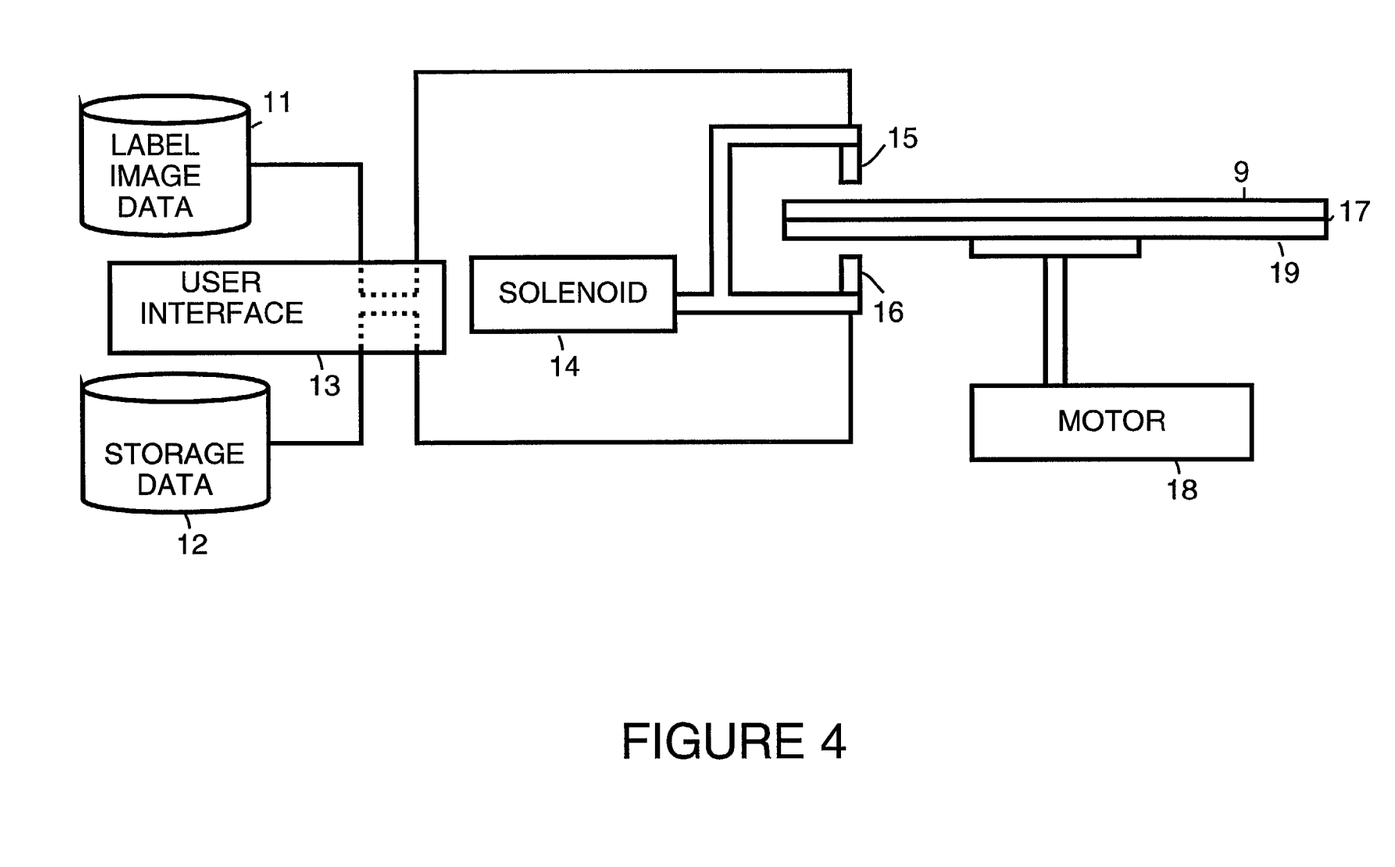
FIG. 4 is a simplified schematic diagram of a data recording and labeling system in accordance with an embodiment of the present invention.

FIG. 4 is a simplified schematic diagram of a combined optical recording and labeling system. The system uses a head 15 to write label image data 11 to a label surface 9 of a disk 17. The system uses a head 16 to write storage data 12 to a data storage surface 19 of a disk 17. Data storage surface 19, for example, conforms to standards for CD-R, CD-RW, DVD-R, DVD-RW, or some other disk storage format.

A motor 18 is part of a disk drive used to turn disk 17 during reading or writing. A solenoid 14 is used in the positioning of head 15 and head 16. A user interface 13 allows a user to control the system.

Figure 5:
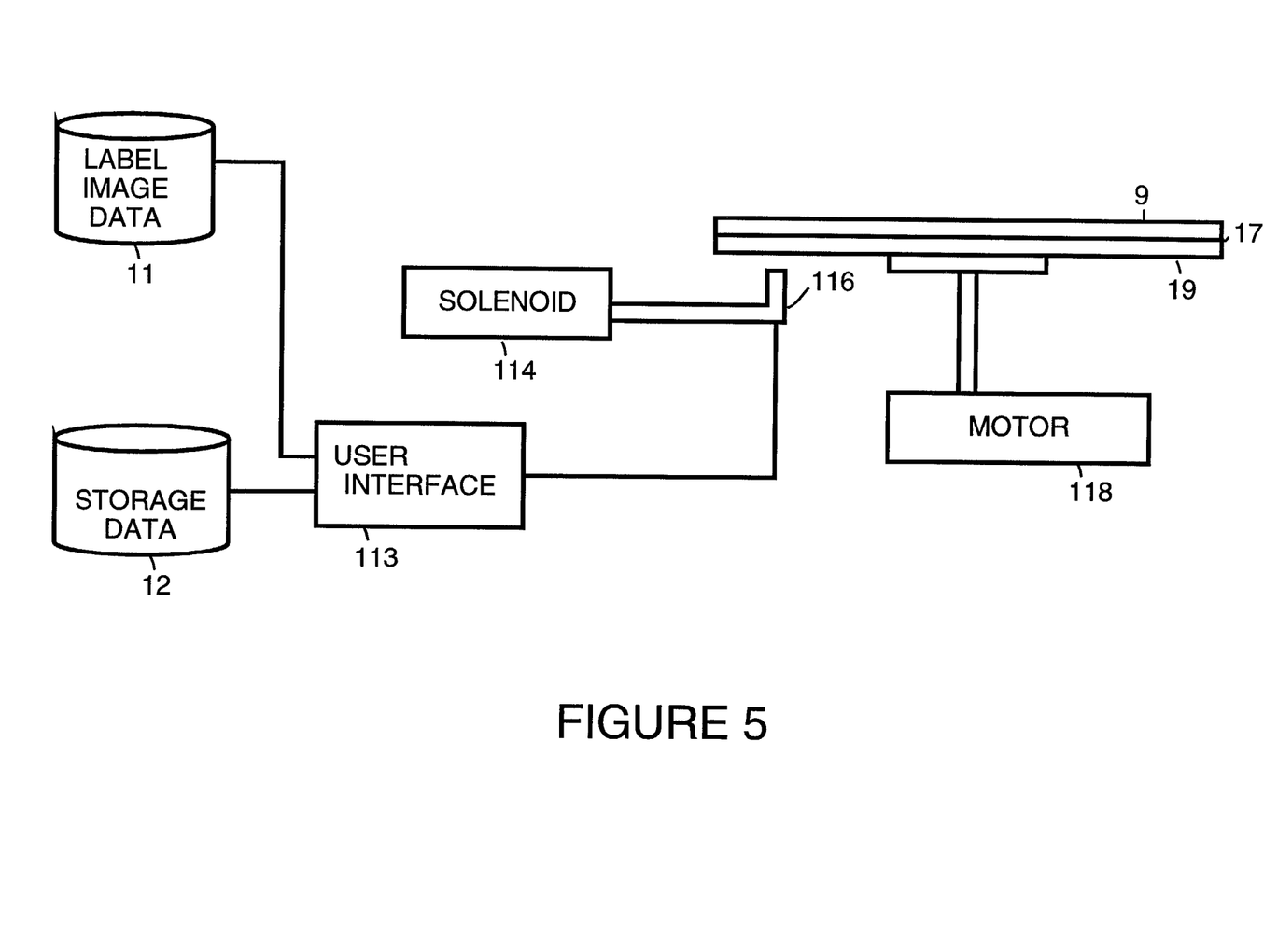
FIG. 5 is a simplified schematic diagram of a data recording and labeling system in accordance with an alternative embodiment of the present invention.

Alternative embodiments of combined optical recording and labeling systems or stand alone labeling systems can also be used to write label image data 11 to disk 17. For example, FIG. 5 shows a single head 116 being used to write storage data 12 to data storage surface 19 of disk 17 and to write label image data 11 to label surface 9 of disk 17. Disk 17 is flipped over so that single head 116 has access to whichever surface of disk 17 is currently to be written. A motor 118 is part of a disk drive used to turn disk 17 during reading or writing. A solenoid 114 is used in positioning of head 116. A user interface 113 allows a user to control the system.

In order to allow labeling, labeling surface 9 of disk 17 is coated with a laser-sensitive layer composed of, for example, thermochromic and/or photochromic materials. The coating is performed, for example by a spin-on process, or another type of process such as screen printing or inkjet printing.

The labeling materials are activatable by a laser. For example, the thermochromic materials are colorant materials such as the ones used in thermal papers, that, when passed through an imaging device with precise measures of heat applied by the print head, undergo a reaction that creates an image on the paper. In "direct" thermography a visible image pattern is formed by local heating of a recording material containing matter that by chemical or physical process changes color or optical density. On heating to a certain conversion temperature, an irreversible chemical reaction takes place and a colored image is produced.

For simple text or grayscale imaging, essentially the same chemicals used in thermal fax paper can be used. For example, the production of a silver metal image on thermal fax paper is by means of a thermally induced on-reduction reaction of a silver soap with a reducing agent. Alternatively, suitable heat-sensitive dyes can be used, such as dyes which undergo decomposition and hence a visible and permanent color change when exposed to a desired temperature. Typical examples of such dyes available and known in the art are Basic Green 4, commercially available as Victoria Green from Keystone Aniline Corp., and Solvent Yellow 56, commercially available as Sudan Yellow 150, from BASF Wyandotte Corp.

Other examples of heat sensitive dyes incorporated into inks that can be used include Chemithermal CFBK90 (white to black), Chemithermal CFBK120 (white to black), Chemithermal CFBE90 (white to blue), and Chemithermal CFBE120 (white to blue), Chemithermal CFBK 90 and Chemithermal. Each of the above inks are manufactured by Sherwood Technology Ltd. Another example of heat-sensitive inks are Permanent Temp Tell Ink in Yellow, Red, Blue, Green, Orange, Purple and Black manufactured by International Ink Company.

For more information on producing labels, see U.S. patent application Ser. No. 09/976,877 filed Oct. 11, 2001, the subject matter of which is herein incorporated by reference.

Providing users with the ability to label disks, as described above, can present problems when a manufacturer or other prior labeler desires protection from a user haphazardly overwriting regions of disks that are intended to be left blank or are pre-imaged.

When laser imageable coatings, as described above, are spun on or otherwise applied by processes such as screen printing, dry rolling or inkjet printing, the imageable surface generally covers the enter disk surface, starting at a certain inside diameter (where the coating material is flowed on) and running to the edge of the disk. Left like this, the entire disk surface is imageable by the user.

Figure 6:
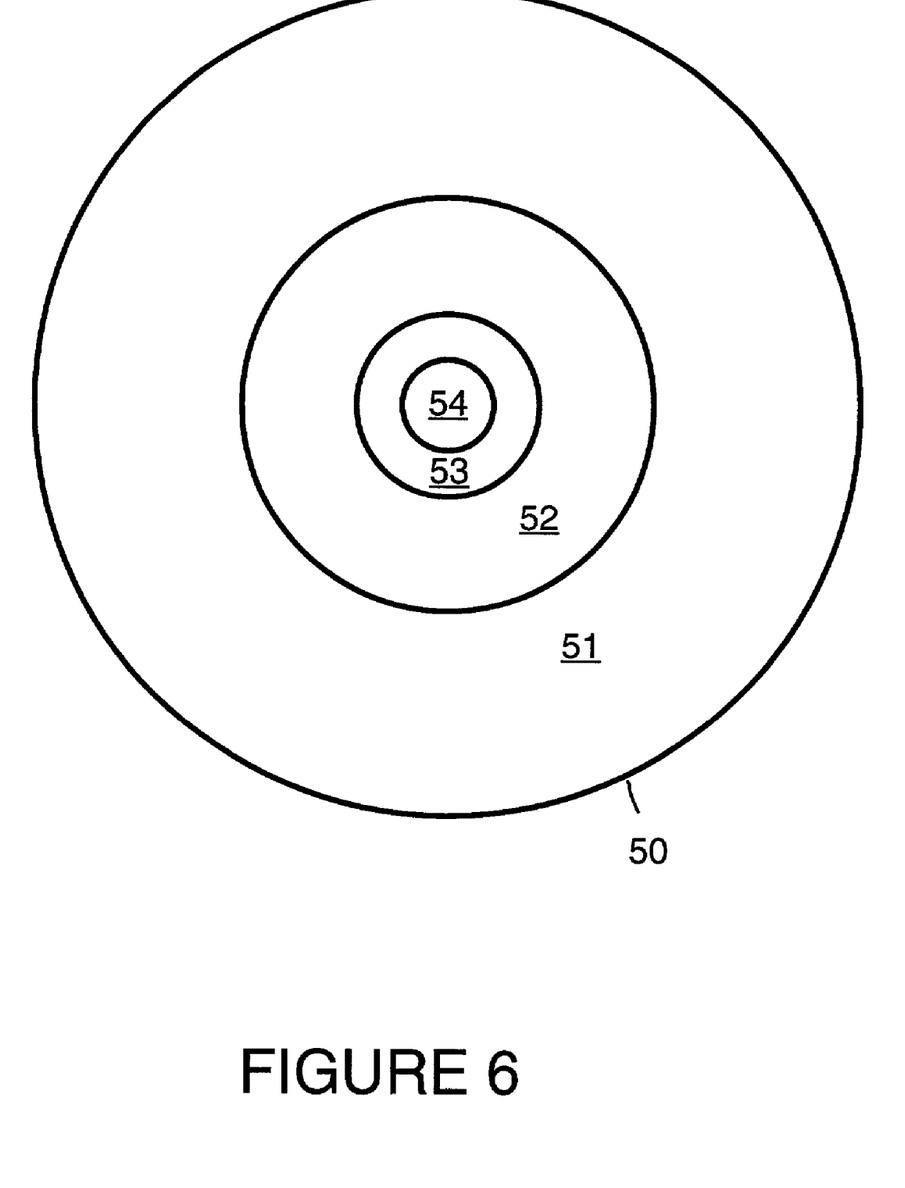
FIG. 6 shows separate labeling regions on the surface of a disk in accordance with an embodiment of the present invention.

This may not always be desirable. For example, it may not be desired to have imaging run all the way to the very edge of the disk (full bleed). It may be desire that a band around the edge of the disk always remain unimaged for appearance sake or to reserve this ring for other informative or decorative information. This is illustrated by FIG. 6. In FIG. 6, the labeling surface of a disk 50 includes a region 53 of bare substrate surrounding a hole 54. A region 51 can be imaged by a user while a band 52 is to remain unimaged by the user.

Alternatively, it might be desirable to prevent a user from using a laser to write labeling material on other specific regions of a disk. For example, this can be in order to reserve the specific regions for other uses such as for a pre-labeled company logo, security labeling, or blank spots for hand-written notes.

On places in which it is desired to block a user from further labeling a disk, blocking material is placed. The blocking material is, for example, opaque or reflective in the set of wavelengths of the imaging laser (780 nm for example). It is not critical that the material be totally opaque, but only that the laser energy be attenuated enough to prevent laser energy transmission sufficient to transition the imaging material below. At the same time the material may or may not need to be transparent at visible wavelengths depending on what is to be (visibly) presented to the observer. Alternatively, the blocking material is transparent in the visible spectrum, but reflective in the laser (infrared (IR)) spectrum. When using blocking material that is reflective in the IR spectrum, there is less chance of blocking material heating the thermochromic material to transition by conduction.

The blocking material is applied, for example, by using a silk screen. Alternatively, the blocking material is sprayed on through a mask. Any other method of depositing the blocking material can be used provided it is possible to control over which area the blocking material is applied to the disk.

Figure 7:
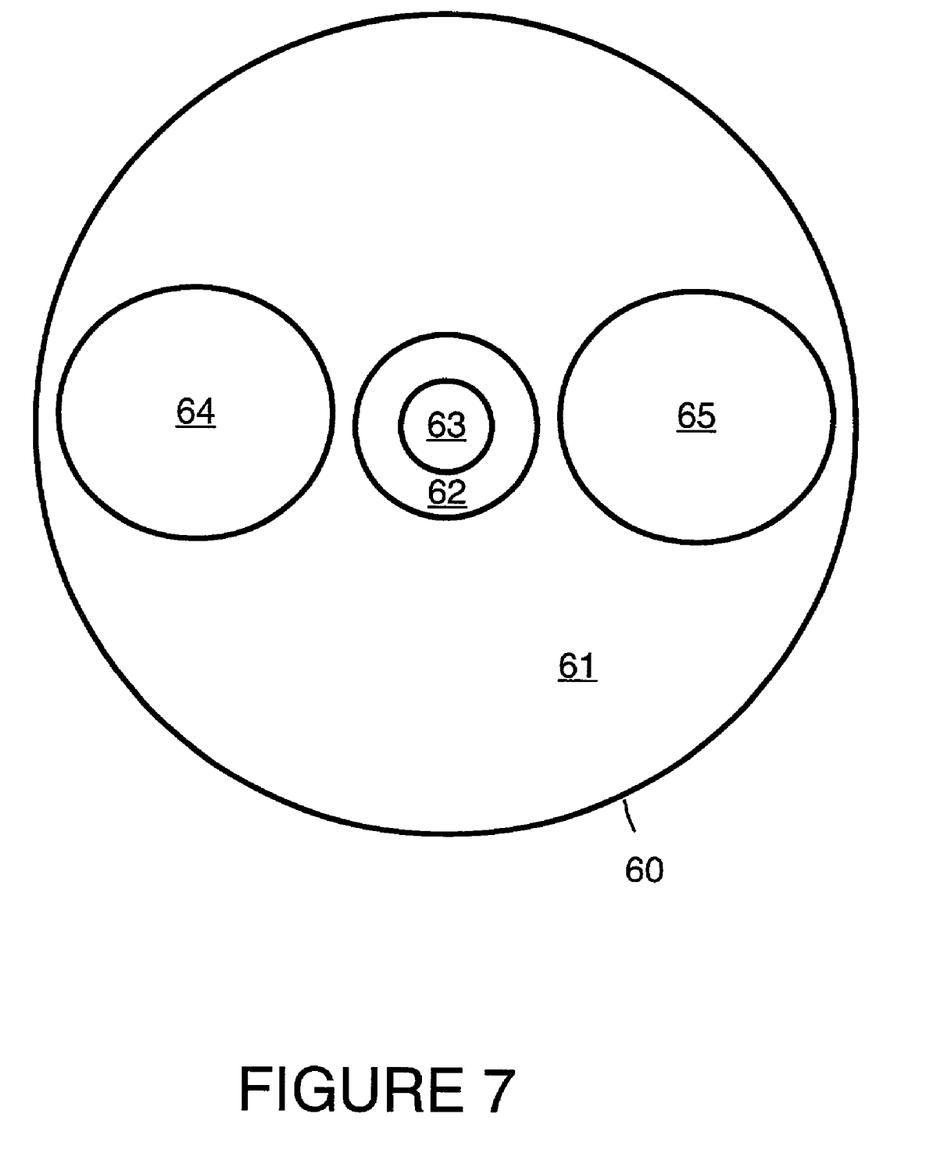
FIG. 7 shows separate labeling regions on the surface of a disk in accordance with an alternative embodiment of the present invention.

For example, in FIG. 7, the labeling surface of a disk 60 includes a region 62 of bare substrate surrounding a hole 63. A region 61 can be imaged by a user. Blocking material is placed over a region 64 and a region 65.

Figure 8:
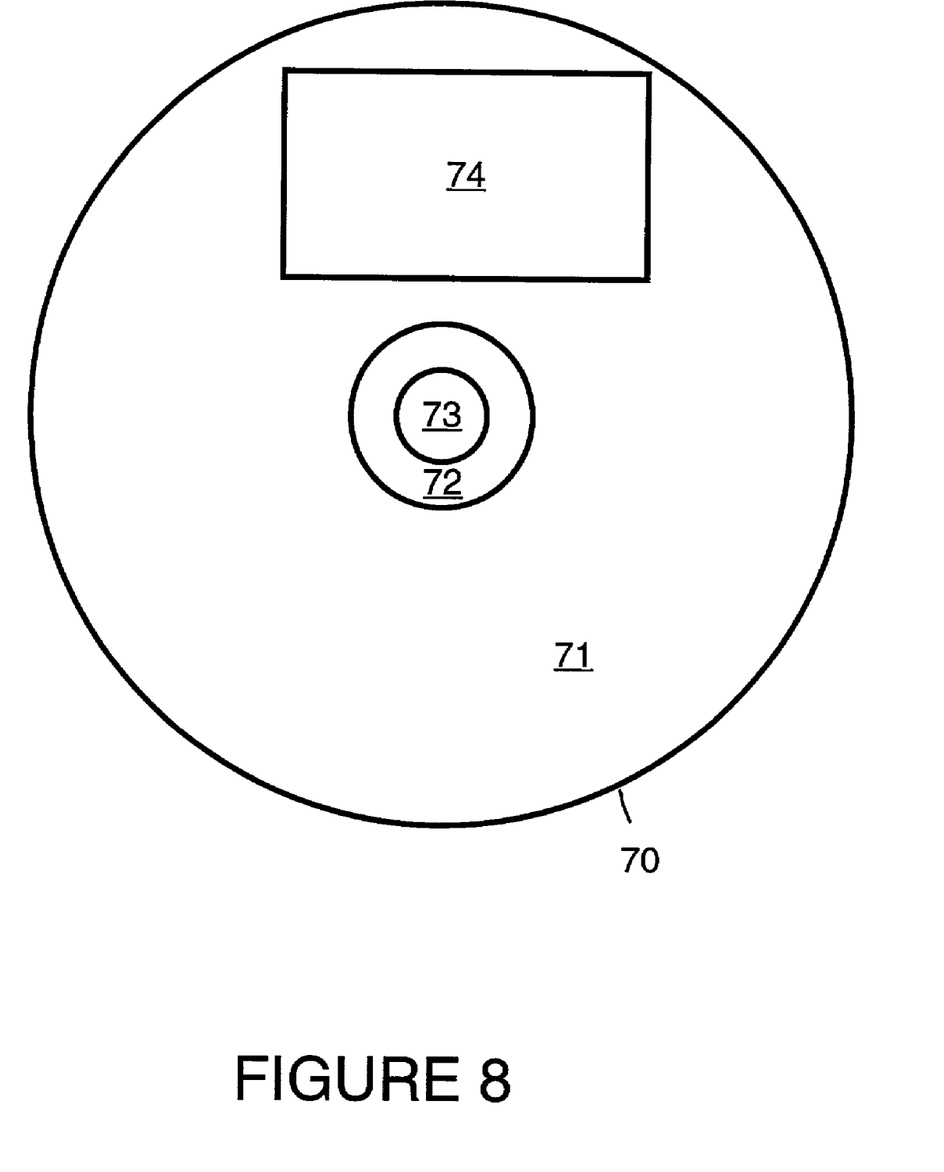
FIG. 8 shows separate labeling regions on the surface of a disk in accordance with an alternative embodiment of the present invention.

For example, in FIG. 8, the labeling surface of a disk 70 includes a region 72 of bare substrate surrounding a hole 73. A region 71 can be imaged by a user. Blocking material is placed on a region 74.

Figure 9:
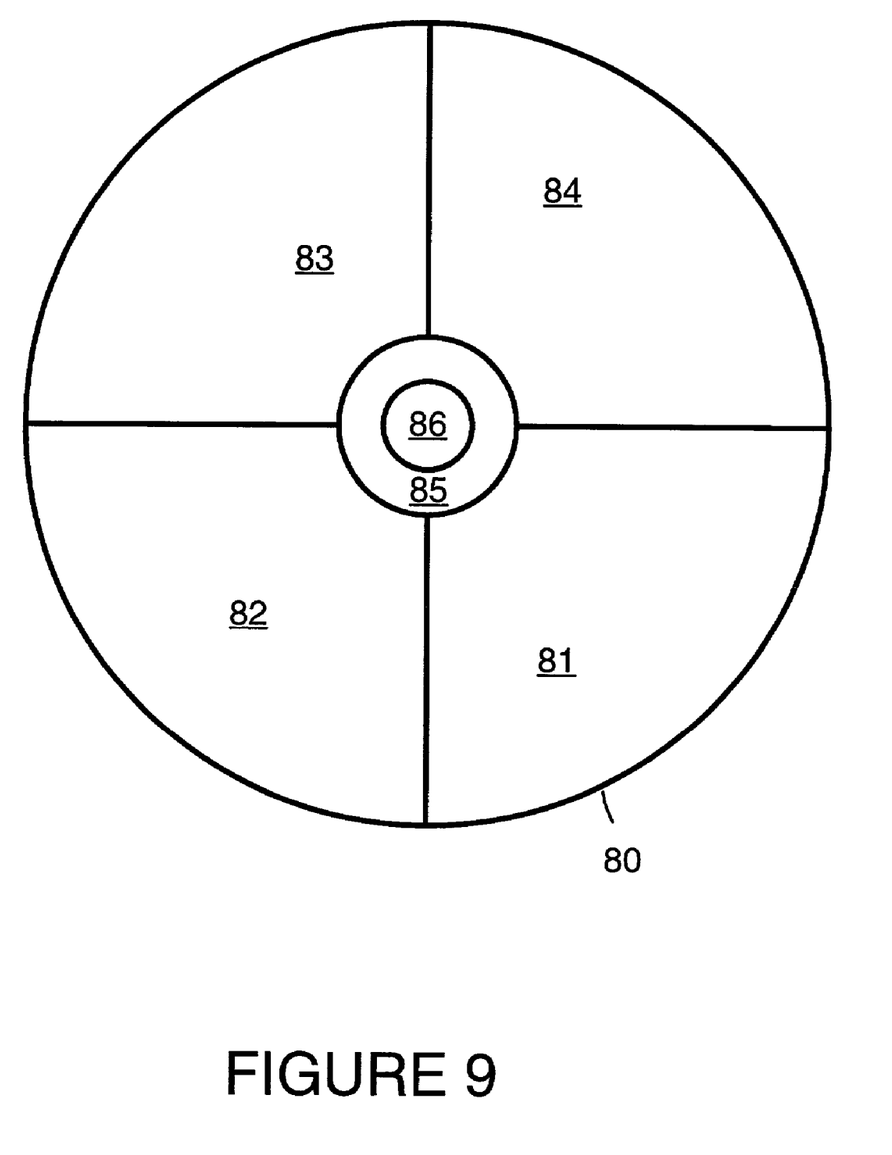
FIG. 9 shows separate labeling regions on the surface of a disk in accordance with an alternative embodiment of the present invention.

For example, in FIG. 9, the labeling surface of a disk 80 includes a region 85 of bare substrate surrounding a hole 86. A region 81 and a region 83 can be imaged by a user. Blocking material is placed on a region 82 and a region 84.

For example, the blocking material is composed of a polymethylmethacrylate/melamine polymer mixtures that absorb at 725–800 nm, but very little in visible spectrum. Alternatively, the blocking material is composed of coats (layers) of indium oxide, tin oxide and/or Nb oxide. Alternatively, a thin coats (less than 200 Å) of metal such as aluminum with aluminum oxide surface is used as the blocking material.

Alternatively, various glasses or plastics can be used as blocking material. For example a glass or plastic material coated with cupric salts or complexes such as porphyrin provide the appropriate light absorption.

Alternatively, porphyrin complexes of silicon oxide and esters can be used as the blocking material. Additionally, photonic band selection materials that reject infrared radiation at 725–800 nm can be used as blocking material. Spectrally selective coatings are available from photonic companies such as Schott Glas with a business address of Hattenbergstrasse 10, 55122 Mainz, Germany. Schott makes glass that is infrared reflective. Hoya Filters, available from Hoya Corporation, having a business address of 2-7-5 Naka-Ochiai, Shin juku-ku, Tokyo 161-8525, Japan, utilize similar technology. Also, thin coatings of silicon and composites of alternating films of metal and metal oxides or halides, for example, MgF2 and aluminum can be used as blocking material. Also, Pr, Praseodymium oxide can be used as an absorptive coating.

Even though various embodiments of the present invention provide superior labeling technology, cost-effective production of disks with labels imageable by lasers require significant volumes. Likewise, cost effective production of disk drives that can be used to label disks or other data storage devices also require significant volumes.

Desirability of data storage devices and thus demand for data storage devices can be increased by placing consumer desired images onto the label. The consumer desired images includes, but is not limited to, advertisements, company or team logos, trading card images and rub-off surfaces such as lottery tickets.

Allowing advertisers to add a non-writable advertisement onto a data storage device label as prepaid content, provides a way to absorb the cost of the underlying data storage device. This allows distribution of the data storage device to potential customers for free or for a reduced cost such as through a fast food promotion. The result is that consumers become awash with label recordable data storage devices. The result is that there is a demand for drives that will write labels for laser imageable data storage devices.

Similarly, included on label recordable data storage devices consumer desired image content such as lottery games or images of celebrities increases demand for label recording drives that write on the recordable media. Increased demand for label recording drives increases the demand for laser imageable data storage devices.

Figure 10:
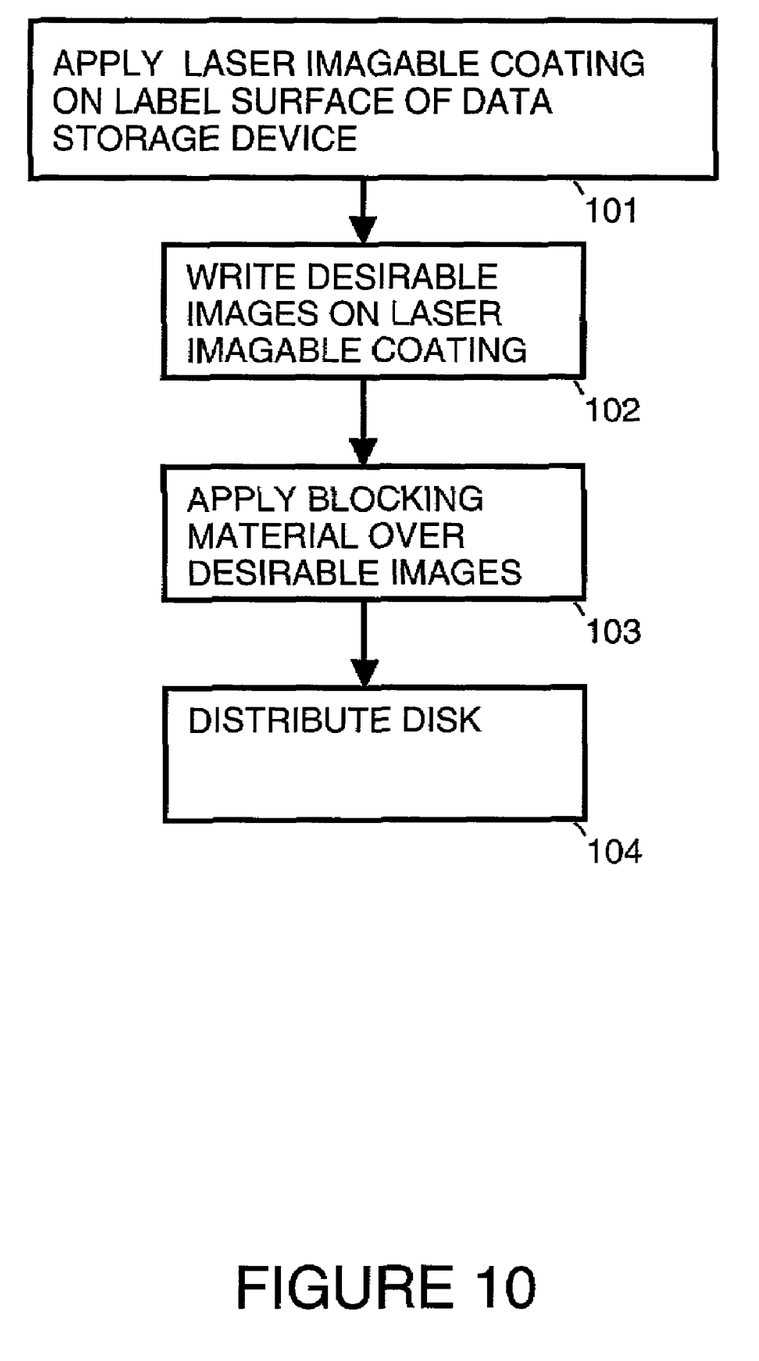
FIG. 10 is a simplified flowchart that illustrates one method for adding consumer desired images onto the label of a data storage device in accordance with an embodiment of the present invention.

FIG. 10 is a simplified flowchart that illustrates one method for adding consumer desired images onto the label of a data storage device. In a step 101, a laser imageable coating is applied on the label surface of the data storage device. In a step 102, desired images are placed on the laser imageable coating, for example using lasers. In a step 103, blocking material is applied over the desirable images, but not over other portions of the label surface. In a step 104 the data storage device is distributed to a user, who may then use a label recording drive to place additional images on the label of the data storage device at locations that are not protected by the blocking material.

Figure 11:
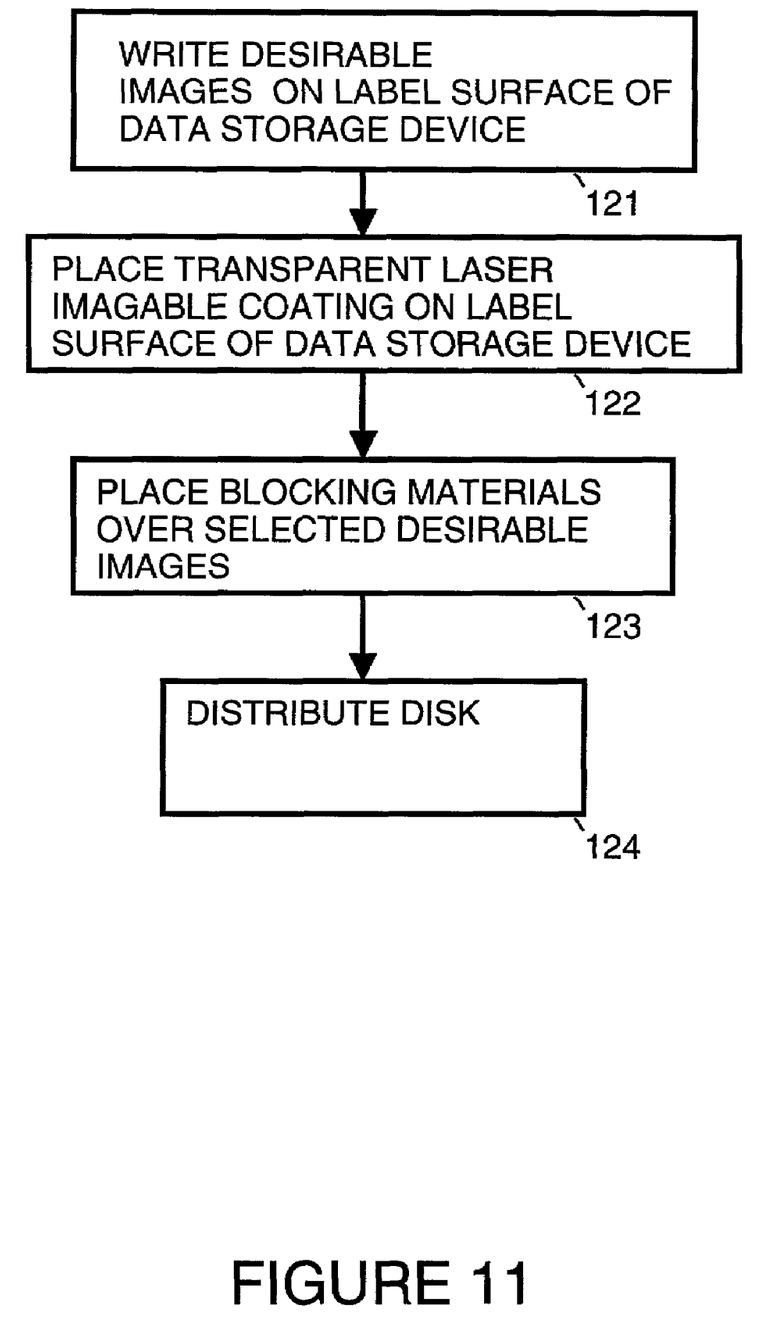
FIG. 11 is a simplified flowchart that illustrates a method for adding consumer desired media onto the label of a data storage device in accordance with an alternative embodiment of the present invention.

FIG. 11 is a simplified flowchart that illustrates an alternative method for adding consumer desired images onto the label of a data storage device. In a step 121, desired images are placed on the label surface of the data storage device. In a step 122, a transparent laser imageable coating is placed on the label surface of the data storage device. In a step 123, blocking material is applied over selected desirable images, but not over other portions of the label surface. The selected desirable images can be all the desirable images, some of the desirable images or none of the desirable images, depending on the application. For example, blocking printing over none of the desirable images may be desirable in the case where the images are faded image, a watermark, or some sort of color background.

In a step 124 the data storage device is distributed to a user, who may then use a label recording drive to place additional images on the label of the data storage device at locations that are not protected by the blocking material.

Figure 12:
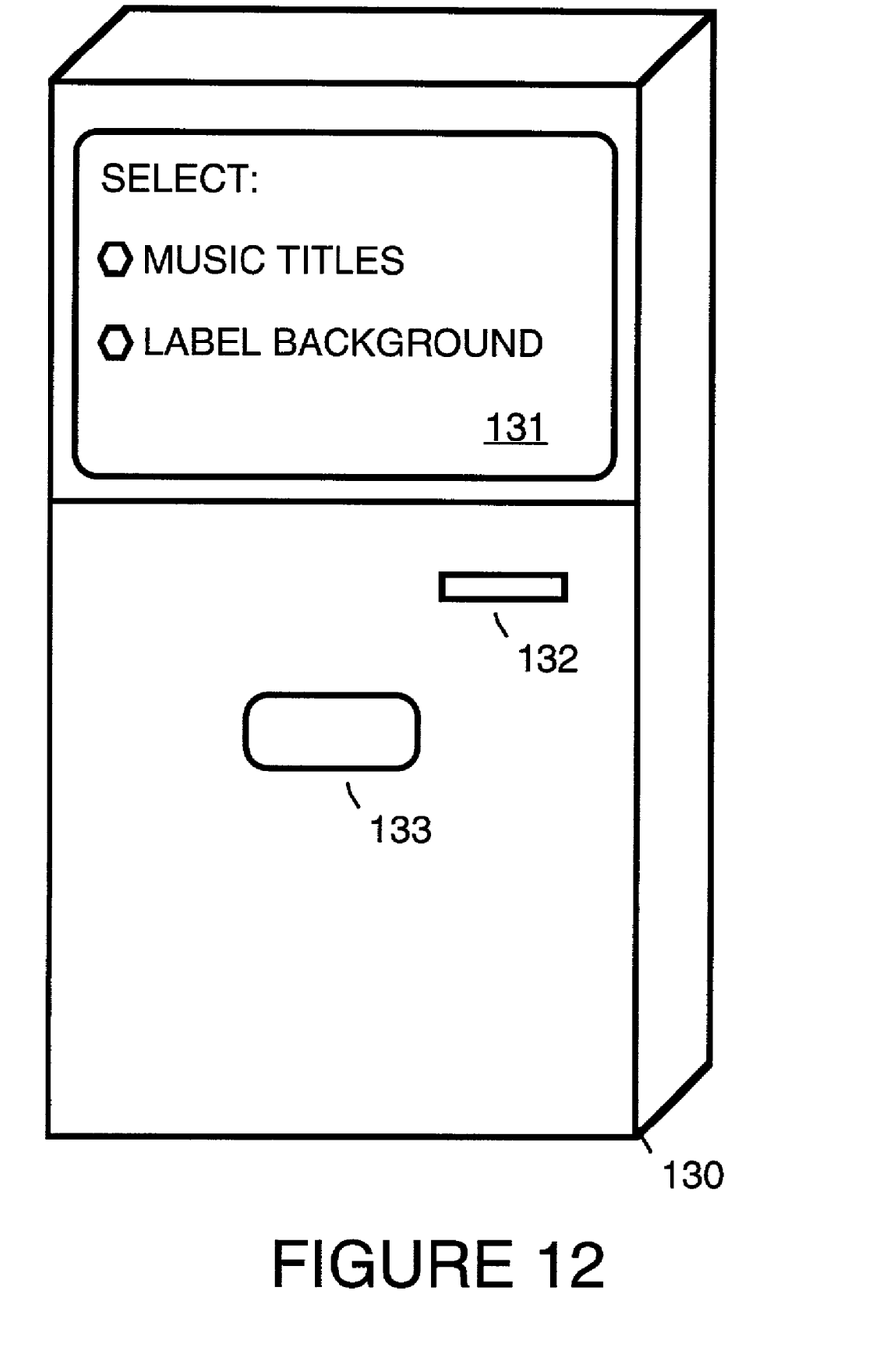
FIG. 12 is a block diagram of a music kiosk in accordance with an embodiment of the present invention.

For example, either method described above may be implemented by a music kiosk, such as that shown in FIG. 12. In FIG. 12, a touch screen 131 of a kiosk 130 allows a user to select music titles and a label background to be placed on a data storage device. The user pays for the data storage device with cash, a credit card or a debit card using a payment slot 132. The labeled data storage device is delivered at a delivery output 133. The completed data storage devices has a label on which is printed the names of the music titles over the selected background. In a preferred embodiment, a printed case cover is also included.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A data storage device comprising:
    a data storage mechanism; and,
    a surface used for labeling, the surface being covered, at least in part, with a laser imageable coating;
    wherein blocking material is placed over a portion of the laser imageable coating, the blocking material blocking laser imaging on the portion of the laser imageable coating over which the blocking material is placed.

2. A data storage device as in claim 1 wherein the portion of the laser imageable coating over which the blocking material is placed includes an image that is protected from overwriting by the blocking material.

3. A data storage device as in claim 1 wherein the portion of the laser imageable coating over which the blocking material is placed includes a blank area that is protected from overwriting by the blocking material.

4. A data storage device as in claim 1 wherein the portion of the laser imageable coating over which the blocking material is placed includes a portrait of a celebrity that is protected from overwriting by the blocking material.

5. A data storage device as in claim 1 wherein the portion of the laser imageable coating over which the blocking material is placed includes a game image that is protected from overwriting by the blocking material.

6. A data storage device as in claim 1 wherein the blocking material is composed of material that is transparent in visible light but opaque in a set of wavelengths of light used by an imaging laser to place an image on the laser imageable coating.

7. A data storage device as in claim 1 wherein the blocking material is composed of material that is transparent in visible light but reflective in a set of wavelengths of light used by an imaging laser to place an image on the laser imageable coating.

8. A data storage device as in claim 1 wherein the data storage device is one of the following:
    a compact disk read only memory storage device;
    a compact disk recordable storage device;
    a digital versatile disk read/write storage device;
    a digital versatile disk read only memory storage device;
    a digital versatile disk recordable storage device;
    a digital versatile disk read/write storage device.

9. A medium produced by a method comprising:
    (a) covering at least a portion of a surface of the medium with a laser imageable coating; and,
    (b) placing blocking material over a portion of the laser imageable coating, the blocking material being selected to prevent an imaging laser from placing any additional image on the portion of the laser imageable coating covered by the blocking material.

10. A medium as in claim 9 wherein the portion of the laser imageable coating over which the blocking material is placed includes a blank area that is protected from overwriting by the blocking material.

11. A medium as in claim 9 wherein the portion of the laser imageable coating over which the blocking material is placed includes a portrait of a celebrity that is protected from overwriting by the blocking material.

12. A medium as in claim 9 wherein the portion of the laser imageable coating over which the blocking material is placed includes a game image that is protected from overwriting by the blocking material.

13. A medium as in claim 9 wherein the blocking material is composed of material that is transparent in visible light but opaque in a set of wavelengths of light used by an imaging laser to place an image on the laser imageable coating.

14. A medium as in claim 9 wherein the blocking material is composed of material that is transparent in visible light but reflective in a set of wavelengths of light used by an imaging laser to place an image on the laser imageable coating.

15. A medium as in claim 9 wherein the portion of the laser imageable coating over which the blocking material is placed includes an image that is protected from overwriting by the blocking material.

16. A medium as in claim 9 wherein the medium is one of the following:
    a compact disk read only memory storage device;
    a compact disk recordable storage device;
    a compact disk read/write storage device;
    a digital versatile disk read only memory storage device;
    a digital versatile disk recordable storage device;
    a digital versatile disk read/write storage device.

17. A method of producing a medium comprising the following steps:
    (a) covering at least a portion of a surface of the medium with a laser imageable coating; and,
    (b) placing blocking material over a portion of the laser imageable coating, the blocking material being selected to prevent an imaging laser from placing any additional image on the portion of the laser imageable coating covered by the blocking material.

18. A medium as in claim 17 wherein the blocking material is composed of material that is transparent in visible light but opaque in a set of wavelengths of light used by an imaging laser to place an image on the laser imageable coating.

19. A medium as in claim 17 wherein the blocking material is composed of material that is transparent in visible light but reflective in a set of wavelengths of light used by an imaging laser to place an image on the laser imageable coating.

20. A medium as in claim 17 wherein the portion of the laser imageable coating over which the blocking material is placed includes an image that is protected from overwriting by the blocking material.

21. A medium as in claim 17 wherein the portion of the laser imageable coating over which the blocking material is placed includes a blank area that is protected from overwriting by the blocking material.

22. A method of producing a data storage device, comprising the following:
    placing an image in a region of a surface of the data storage device;
    covering at least a portion of a surface of the data storage device with a transparent laser imageable coating, including covering the region in which is placed the image; and,
    placing blocking material over a portion of the transparent laser imageable coating, the blocking material being selected to prevent an imaging laser from placing any additional image on the portion of the transparent laser imageable coating covered by the blocking material.

23. A data storage device as in claim 22 wherein the image includes a portrait of a celebrity that is protected from overwriting by the blocking material.

24. A data storage device as in claim 22 wherein the image includes a color background.

25. A method for labeling a data storage device, comprising the following steps:
(a) using a laser to place a labeling image on a laser imageable coating covering at least a portion of a label surface of the data storage device, including the following substep:
(a.1) being blocked from placing any portion of the labeling image on blocking material placed over a portion of the laser imageable coating, the blocking material being selected to prevent an imaging laser from placing any additional image on the portion of the laser imageable coating covered by the blocking material.

26. A method as in claim 25 wherein the portion of the laser imageable coating over which the blocking material is placed includes an image that is protected from overwriting by the blocking material.

27. A method as in claim 25 wherein the portion of the laser imageable coating over which the blocking material is placed includes a blank area that is protected from overwriting by the blocking material.

28. A method as in claim 25 wherein the data storage device is one of the following:
a compact disk read only memory storage device;
a compact disk recordable storage device;
a compact disk read/write storage device;
a digital versatile disk read only memory storage device;
a digital versatile disk recordable storage device;
a digital versatile disk read/write storage device.

29. A data storage device comprising:
surface means for containing labeling information;
laser imageable coating means for being imageable by a laser, the laser imageable coating means covering at least a portion of the surface means; and,
blocking means for blocking laser imaging, the blocking means being placed over a portion of the laser imageable coating means.

30. A data storage device as in claim 29 wherein the blocking means is composed of material that is transparent in visible light but opaque in a set of wavelengths of light used by an imaging laser to place an image on the laser imageable coating means.

31. A data storage device as in claim 29 wherein the blocking means is composed of material that is transparent in visible light but reflective in a set of wavelengths of light used by an imaging laser to place an image on the laser imageable coating means.

32. A method of increasing user desirability of a data storage device comprising the following steps:
(a) covering at least a portion of a label surface of the data storage device with a laser imageable coating;
(b) using a laser to write a consumer desirable image over some but not all of the laser imageable coating; and,
(c) placing blocking material over the consumer desirable image, but not over remaining portions of the laser imageable coating.

33. A method as in claim 32 wherein the consumer desirable image includes a portrait of a celebrity.

34. A method as in claim 32 wherein the consumer desirable image includes a game image.

35. A method as in claim 32 wherein the consumer desirable image includes at least one of the following:
an advertisement for a product;
an advertisement for a service;
a company logo;
a team logo;
a trademark.

36. A method of increasing user desirability of a data storage device, comprising the following:
placing a consumer desirable image in a region of a surface of the data storage device;
covering at least a portion of a surface of the data storage device with a transparent laser imageable coating, including covering the region in which is placed the image; and,
(c) placing blocking material over a portion of the transparent laser imageable coating, the blocking material being selected to prevent an imaging laser from placing any additional image on the portion of the transparent laser imageable coating covered by the blocking material.

37. A method as in claim 36 wherein the consumer desirable image includes a portrait of a celebrity.

38. A method as in claim 36 wherein the consumer desirable image includes a game image.

39. A method as in claim 36 wherein the consumer desirable image includes a color background.

40. A method as in claim 36 wherein the consumer desirable image includes at least one of the following:
an advertisement for a product;
an advertisement for a service;
a company logo;
a team logo;
a trademark.

* * * * *

UNITED STATES PATENT AND TRADEMARK OFFICE
CERTIFICATE OF CORRECTION

PATENT NO.         : 6,983,475 B2
APPLICATION NO. : 10/106550
DATED                 : January 3, 2006
INVENTOR(S)        : Daryl E. Anderson et al.

It is certified that error appears in the above-identified patent and that said Letters Patent is hereby corrected as shown below:

In column 7, line 50, in Claim 8, delete "digital versatile" and insert -- compact --, therefor.

Signed and Sealed this

Twenty-fourth Day of November, 2009

David J. Kappos
*Director of the United States Patent and Trademark Office*